(12) United States Patent
Chou et al.

(10) Patent No.: US 11,496,710 B2
(45) Date of Patent: Nov. 8, 2022

(54) IMAGE DISPLAY METHOD FOR VIDEO CONFERENCING SYSTEM WITH WIDE-ANGLE WEBCAM

(71) Applicant: ASPEED Technology Inc., Hsinchu (TW)

(72) Inventors: Chen-Wei Chou, Hsinchu (TW); Chien-Chou Yang, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 21 days.

(21) Appl. No.: 17/233,047

(22) Filed: Apr. 16, 2021

(65) Prior Publication Data
US 2022/0060660 A1    Feb. 24, 2022

(30) Foreign Application Priority Data

Aug. 19, 2020  (TW) ................................. 109128198
Dec. 23, 2020  (TW) ................................. 109145738

(51) Int. Cl.
  *H04N 7/15*  (2006.01)
  *H04N 7/14*  (2006.01)
  *G09G 5/39*  (2006.01)

(52) U.S. Cl.
  CPC ................. *H04N 7/15* (2013.01); *G09G 5/39* (2013.01); *H04N 7/148* (2013.01); *G09G 2340/0442* (2013.01); *G09G 2340/0464* (2013.01)

(58) Field of Classification Search
  CPC combination set(s) only.
  See application file for complete search history.

(56) References Cited

U.S. PATENT DOCUMENTS

| 10,636,154 B2 | 4/2020 | Schnittman |
| 11,057,572 B1* | 7/2021 | Wang ............... H04N 5/2628 |
| 2008/0232697 A1* | 9/2008 | Chen ................. G06F 16/48 |
| | | 382/225 |

(Continued)

FOREIGN PATENT DOCUMENTS

| CN | 107980221 A | 5/2018 |
| JP | 4908543 B2 | 4/2012 |
| TW | 202018649 A | 5/2020 |

OTHER PUBLICATIONS

Cao; "Realtime Multi-Person 2D Pose Estimation using Part Affinity Fields"; Dec. 7, 2016; https://youtu.be/pW6nZXeWIGM; obtained on Apr. 15, 2021 (pp. 1).

*Primary Examiner* — Phung-Hoang J Nguyen
(74) *Attorney, Agent, or Firm* — Muncy, Geissler, Olds & Lowe, P.C.

(57) ABSTRACT

An image display method applicable to a video conferencing system with a wide-angle webcam is disclosed. The wide-angle webcam is used to capture a panoramic image having an aspect ratio greater than or equal to 2:1. The method includes: framing multiple regions of interest (ROIs) according to the panoramic image, each ROI having at least one of attributes; selecting one from predetermined frame layouts as an output frame layout according to whether to insert a portion of the panoramic image and attributes, positions and the number of the ROIs; and inserting at least one of the portion of the panoramic image and the ROIs into corresponding windows in the output frame layout to form a composite frame according to the attributes of the ROIs.

21 Claims, 18 Drawing Sheets

(56) References Cited

U.S. PATENT DOCUMENTS

| | | | |
|---|---|---|---|
| 2013/0204584 A1* | 8/2013 | Jaquez-Vazquez | G06F 30/13 703/1 |
| 2016/0295128 A1 | 10/2016 | Schnittman et al. | |
| 2018/0054612 A1* | 2/2018 | Kim | H04N 13/302 |
| 2020/0195885 A1 | 6/2020 | Huang | |

* cited by examiner

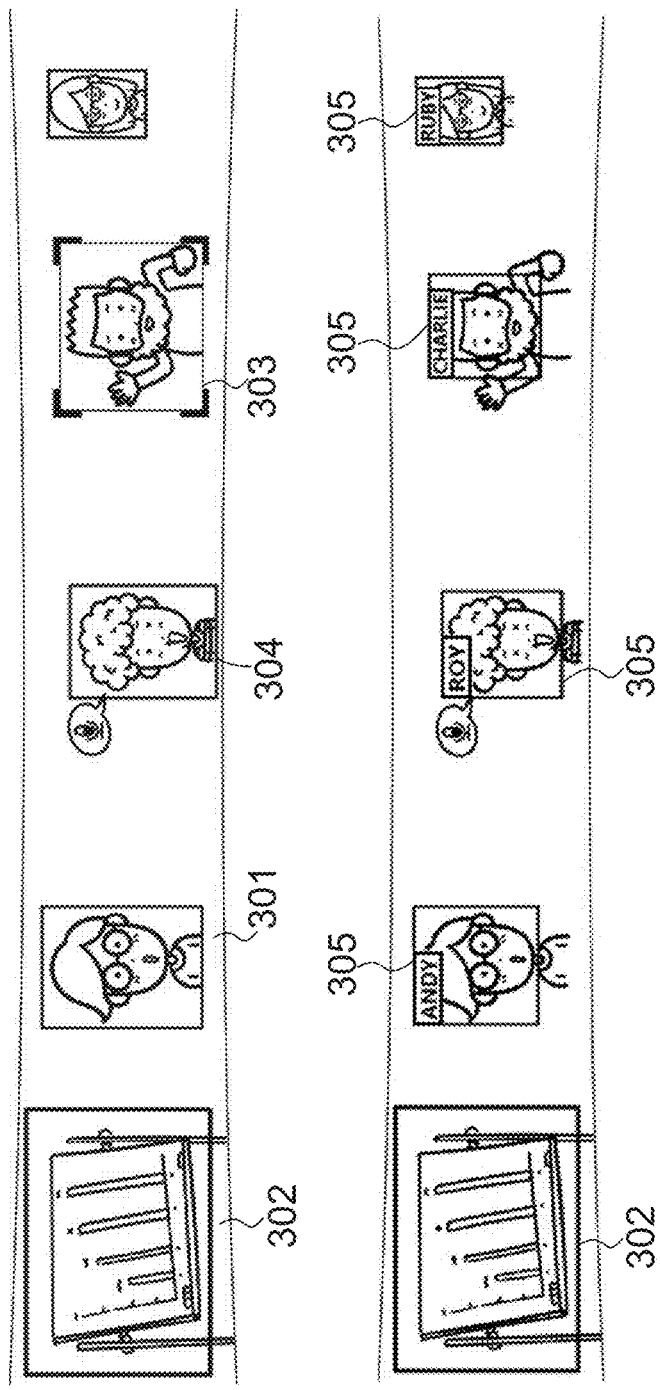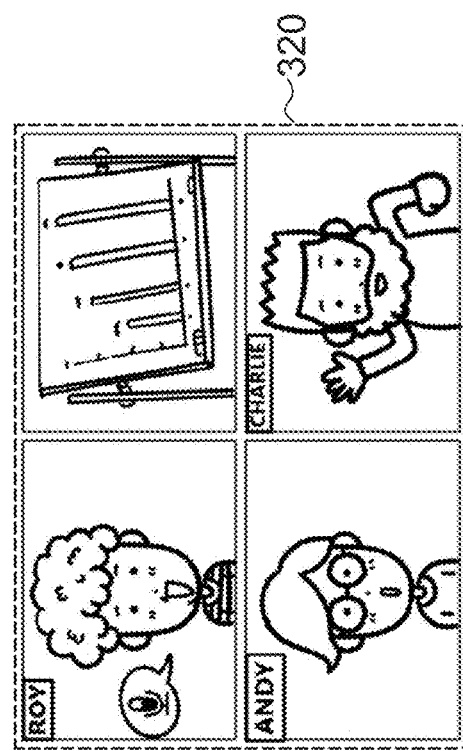
FIG. 3D
FIG. 3E
FIG. 3F

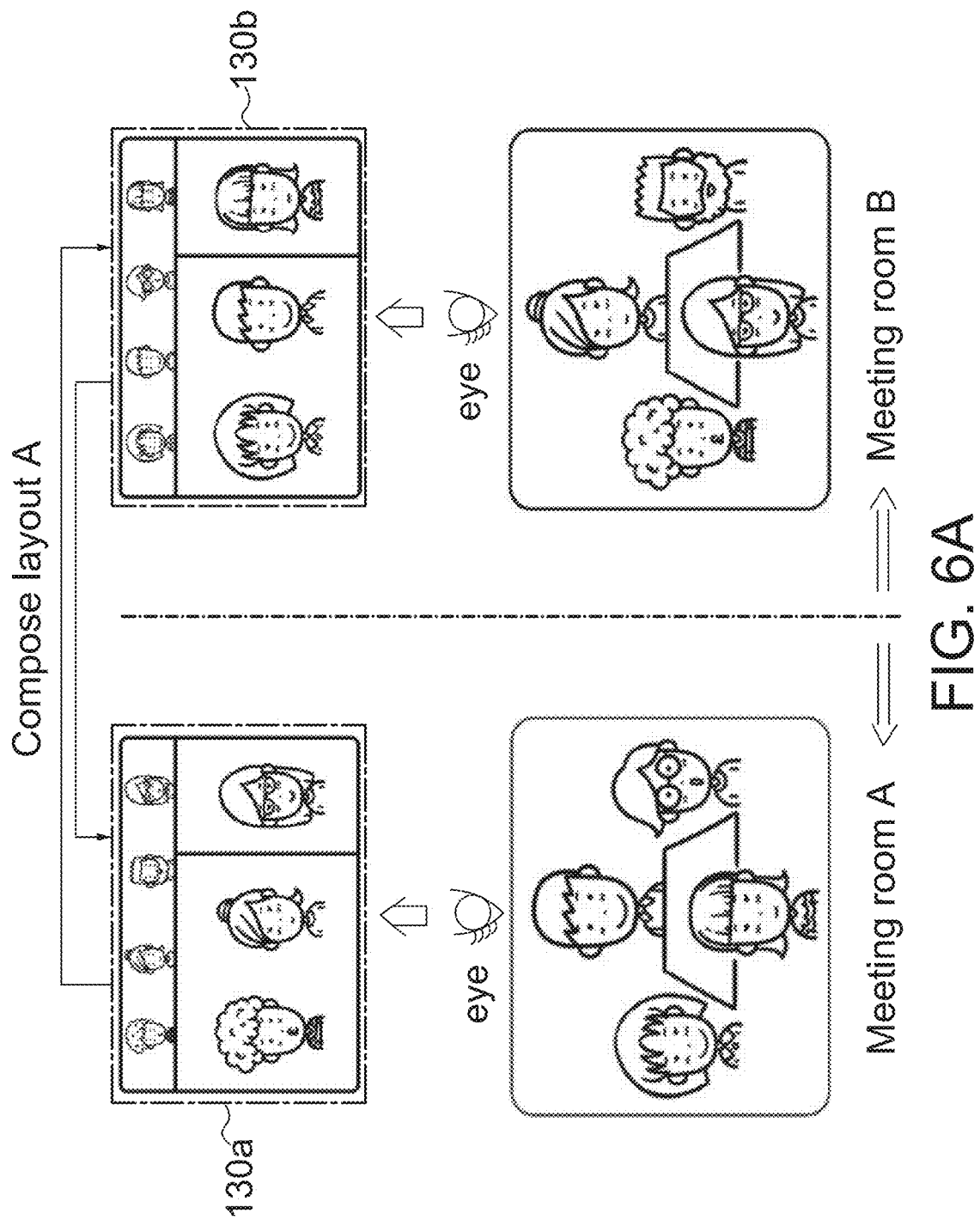

IMAGE DISPLAY METHOD FOR VIDEO CONFERENCING SYSTEM WITH WIDE-ANGLE WEBCAM

CROSS-REFERENCE TO RELATED APPLICATIONS

This application claims priority under 35 USC 119 to Taiwan Patent Application No. 109128198, which was filed on 19 Aug. 2020, and to Taiwan Patent Application No. 109145738, which was filed on 23 Dec. 2020, in the Taiwan Intellectual Property Office, the entire contents of which are hereby incorporated by reference.

BACKGROUND OF THE INVENTION

Field of the Invention

This disclosure relates to an image display method, and more particularly, to an image display method for a video conferencing system with a wide-angle webcam.

Description of the Related Art

Owl Labs has disclosed a human detection method in U.S. Pat. No. 10,636,154 B2, while Ricoh Company, Ltd. has disclosed a sound source detection method in JP Patent No. 4908543 B2. Because existing video conferencing software (e.g., ZOOM) can only display a picture with an aspect ratio of 4:3 or 16:9, it is impossible for a wide-angle webcam with a horizontal angular field of view (HAFOV) greater than or equal to 180 degrees to transmit the whole content of a short and wide panoramic image to the video conferencing software. Even if the short and wide panoramic image is successfully transmitted, the characters in the picture displayed by the video conferencing software would be very small and cannot be easily recognized. This disclosure has been provided in order to solve the above-mentioned problem.

SUMMARY OF THE INVENTION

In view of the above problem, how to remedy the drawbacks in the associated field become great technological issue.

According to one embodiment of this invention, an image display method applicable to a video conferencing system with a wide-angle webcam is provided. The wide-angle webcam is used to capture a panoramic image having an aspect ratio greater than or equal to 2:1. The method includes: framing multiple regions of interest (ROIs) according to the panoramic image, wherein each of the ROIs has at least one of attributes; selecting one of predetermined frame layouts as an output frame layout according to whether to insert a portion of the panoramic image and the attributes, positions and the number of the ROIs; and inserting the portion of the panoramic image and at least one of the ROIs into corresponding windows of the output frame layout to form a composite frame according to the attributes of the ROIs.

One advantage of the above-mentioned embodiment is that multiple sub-scene data or multiple ROIs can be selected for combination from a panoramic image having a horizontal angular field of view (HAFOV) greater than or equal to 180 degrees according to user's preferences, whether there is a speaker and both the number and the distribution of attendees. Analogous to a director, the image display method of the invention may abandon unimportant video clips so that the composite frames finally seen by the attendees are similar to the scenes that the attendees are physically present at the meeting without missing any important details. Besides, key ROIs can be focused/emphasized at any time according to the user's preferences. Conventionally, when the aspect ratio of the panoramic image from a webcam is different from the aspect ratio of a picture presented by the general video software, the only solution is to simply add black blocks above the top or/and below the bottom of the picture, remove left and right portions of the panoramic image, or perform deformation processing over the panoramic image. By contrast, the image display method of this invention can not only increase scene availability but also improve picture aesthetics.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A to 3F show the whole process of framing all ROIs from panoramic images to composite frames according to an embodiment of this invention.

FIGS. 6A to 6G show different predetermined frame layouts in this invention.

DETAILED DESCRIPTION OF THE INVENTION

The following descriptions are preferred embodiments for implementing this invention, and are provided for the purpose for describing the basic spirit of this invention without limiting this invention. The actual contents of this invention must refer to the scope of the following claims.

It must be understood that the words "comprising" and "including" are used in this specification to indicate the existence of specific technical features, values, method steps, operations, elements and/or components, but they do not exclude the possibility of adding more technical features, values, method steps, operations, elements, components or any combinations thereof.

Words such as "first," "second," and "third" are used in the claims to decorate the elements, and are not used to indicate that there is a priority, a pre-relationship or an element prior to another element, or the timing order of execution of method steps, but are only used to distinguish elements with the same name.

It is to be understood that when an element is described as being "connected" or "coupled" to another element, it may be directly connected or coupled to another element, and intermediate elements therebetween may be present. Conversely, when an element is described as being "directly connected" or "directly coupled" to another element, there is no intervening element therebetween. Other terms used to describe the relationship between elements can also be interpreted in a similar manner, such as "between" and "directly between," or "adjacent" as opposed to "directly adjacent" and so on.

Figure 1:
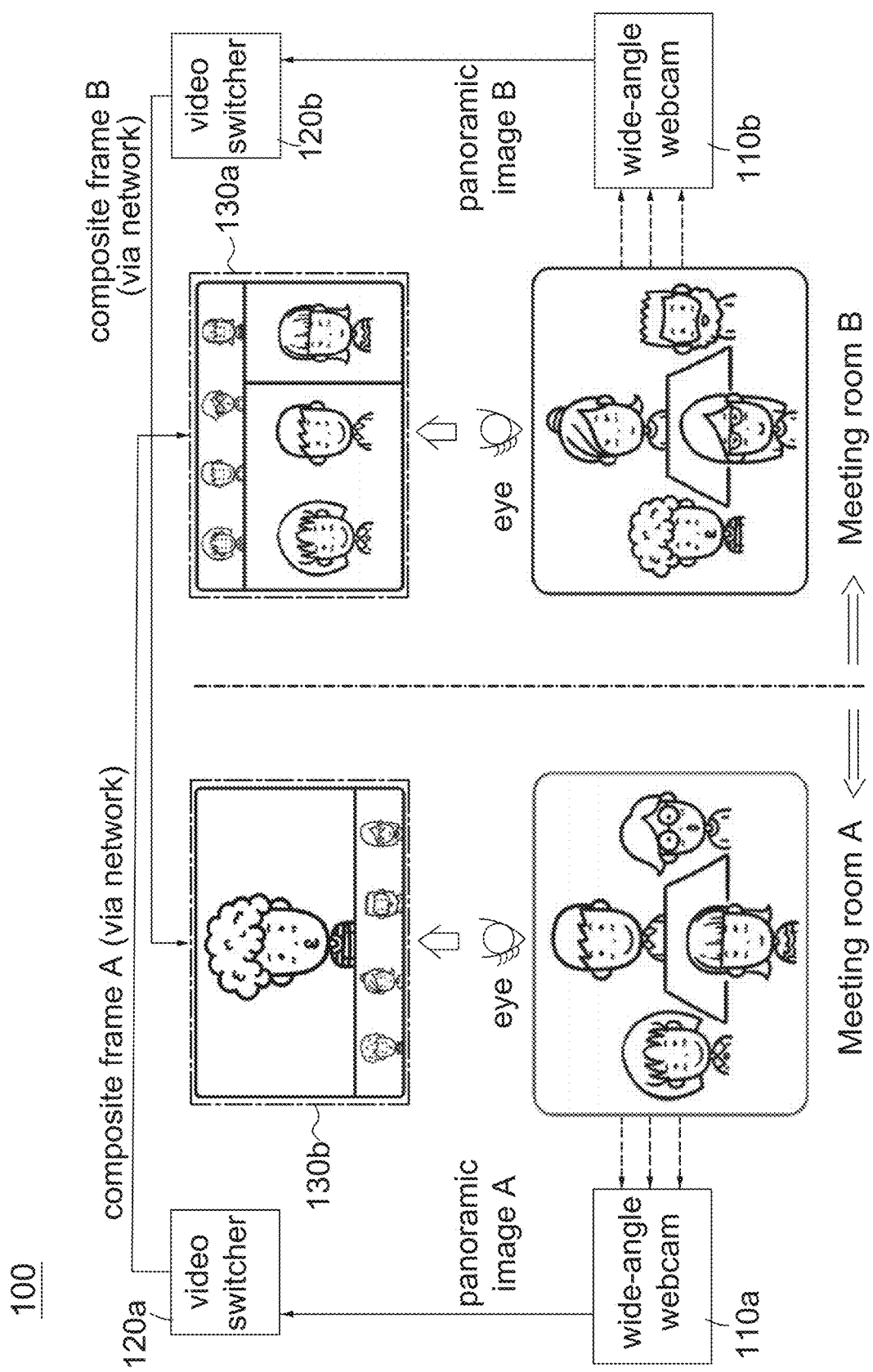
FIG. 1 is a schematic view showing a video conferencing system according to an embodiment of this invention.

FIG. 1 is a schematic diagram showing a video conferencing system 100 according to an embodiment of this invention. Referring to FIG. 1, the video conferencing system 100 includes two wide-angle webcams 110a and 110b, two video switchers 120a and 120b and at least two communication devices 130a and 130b. The wide-angle webcam 110a disposed in a meeting room A captures all attendees, generates a panoramic image A, and transmits the panoramic image A to the video switcher 120a through a network or a USB video device class (UVC). The wide-angle webcam 110b disposed in a meeting room B captures all the attendees, generates a panoramic image B and transmits the panoramic image B to the video switcher 120b through the network or UVC. The wide-angle webcams 110a and 110b may be wide-angle cameras each having a horizontal angular field of view (HAFOV) greater than or equal to 180 degrees, and can generate panoramic images A and B having their HAFOV greater than or equal to 180 degrees. However, the panoramic images defined in this invention are not limited to the images having the HAFOV greater than or equal to 180 degrees, but include all images having their aspect ratios greater than or equal to 2:1. It is to be specified that the aspect ratio represents a relationship between the width and the height of the image, without specifying either any physical dimension of the image or the image dimension measured in units of pixels. Specifically, the aspect ratios of the panoramic images defined in this invention mainly include common formats of 360×180, 180×60, 360×60, 180×90 and the like. The common formats are provided by way of example and not limitations of the invention. In actual implementations, any other formats can be used and these also fall in the scope of the invention.

In one embodiment, each video switcher is implemented by an independent processor and a storage medium (not shown). For example, the video switcher 120b of FIG. 1, separate from the communication device 130b, has an independent processor and a storage medium (not shown). In another embodiment, each video switcher is implemented by a processor and a storage medium (not shown) in a corresponding communication device. For example, the communication device 130a of FIG. 1 includes the video switcher 120a. The storage medium of each of the video switchers stores multiple instructions to be executed by its corresponding processor to perform all the steps of the method of FIGS. 2A and 2B, as will be described in greater detail below. The communication devices 130a and 130b include, but are not limited to, personal computers, tablet computers, smart mobile phones and the like. The communication device 130a executes a first video software (see relevant descriptions in step S220) to transmit a composite frame A from the video switcher 120a to the communication device 130b, receives and displays a composite frame B from the communication device 130b through the network. Similarly, the communication device 130b executes a second video software to transmit the composite frame B from the video switcher 120b to the communication device 130a, receives and displays the composite frame A from the communication device 130a through the network. As shown in FIG. 1, the communication device 130b is disposed in the meeting room B, and the communication device 130a is disposed in the meeting room A, so that all the attendees in the two meeting rooms can see each other through the screens of the communication devices 130a and 130b.

Figure 2A:
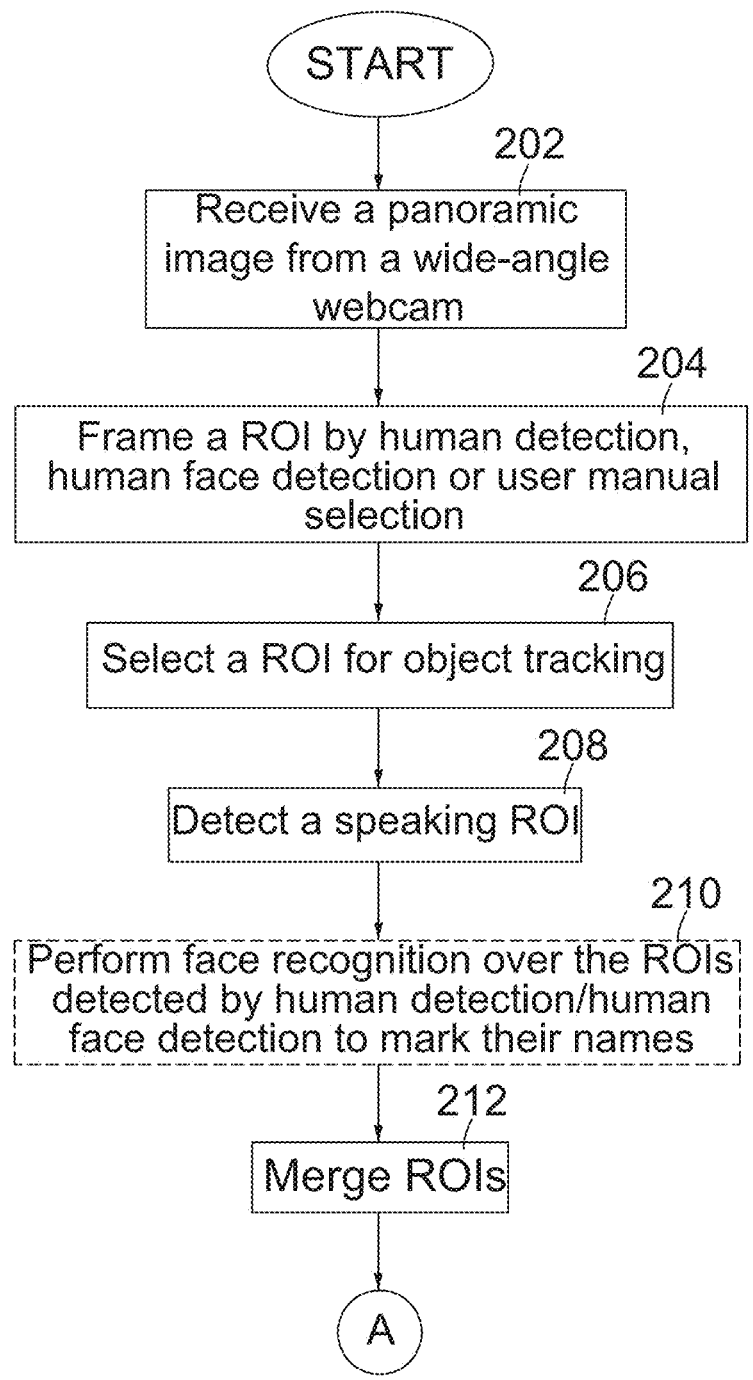
FIGS. 2A and 2B show an image display method according to an embodiment of this invention
Figure 2B:
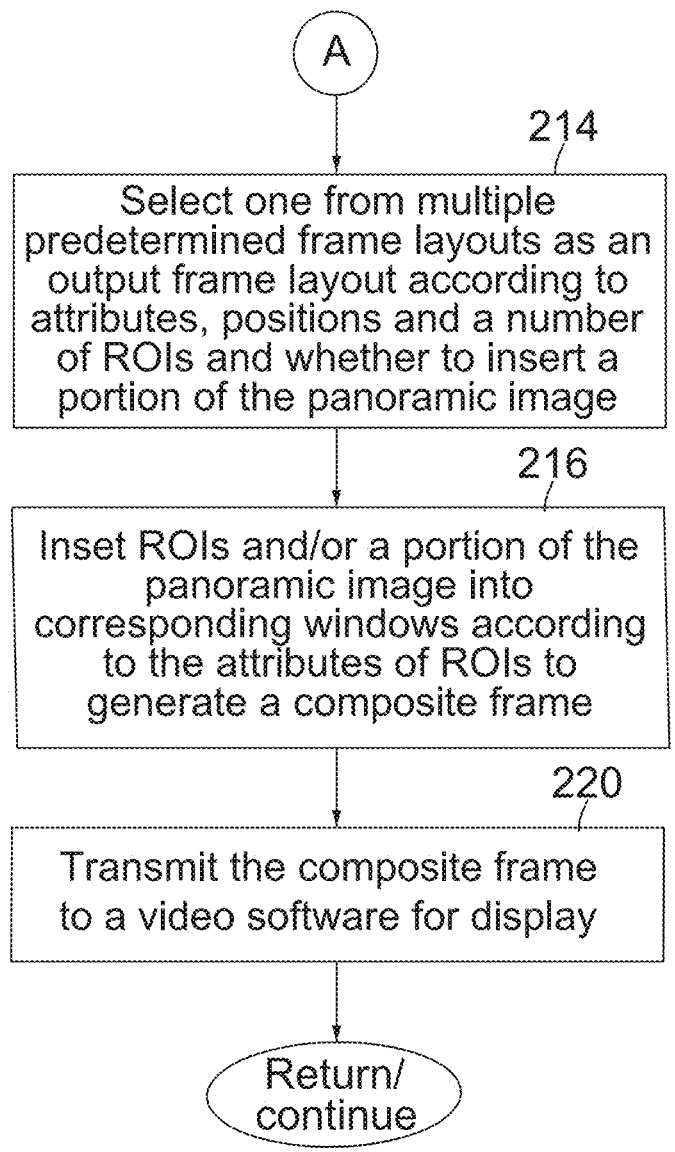

FIGS. 2A and 2B show an image display method according to an embodiment of this invention. FIGS. 3A to 3F show the whole process for framing all regions of interest (ROIs) in panoramic images that are transmitted from the wide-angle webcams 110a and 110b to the video switchers 120a and 120b and converted into composite frames according to an embodiment of this invention. Hereinafter, the image display method of this invention will be described in detail with reference to FIGS. 1, 2A, 2B and 3A to 3F.

Figure 3A:
Figure 3A:
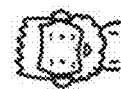
Figure 3A:
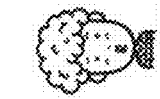
Figure 3A:
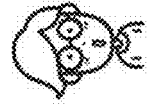
Figure 3A:
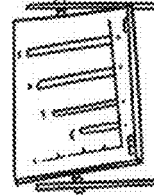

Step S202: Receive a panoramic image 310 having a HAFOV greater than or equal to 180 degrees from one wide-angle webcam. FIG. 3A shows an exemplary panoramic image 310 captured by the wide-angle webcam (110a, 110b). In one embodiment, each wide-angle webcam (110a, 110b) includes at least two lenses and a microphone array.

Figure 3B:
Figure 3B:
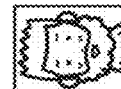
Figure 3B:
Figure 3B:
Figure 3B:

Step S204: Detect or frame a ROI in the panoramic image 310 using one or a combination of human detection, human face detection and user's manual selection. As shown in FIG. 3B, according to this invention, in order to identify a human's position in the panoramic image 310, either the human detection or the human face detection is used to locate the ROI 301. Alternatively, it is feasible to roughly locate by the human detection and then precisely locate the ROI 301 by human face detection. The human detection and the human face detection include, but are not limited to, (a) a deep learning-based approach and/or (b) a machine leaning-based approach. The deep learning-based approach is one kind of artificial intelligence detection (AI detection), for example, using a programming language Python together with an open source computer vision library OpenCV, an open source neural network library Keras and an open source database TensorFlow. Here, OpenCV is used to capture image information for image processing, and the nerve network module provided by Keras is used to perform model training with TensorFlow functioning as the backend. On the other hand, the machine leaning-based approach can be categorized into different learning models, such as hidden Markov models (HMM) and support vector machines (SVM). Basically, conventional machine leaning-based approach requires a developer to decide what features of an image to be used (e.g., turning a portrait into a gradient array), and then the features are transmitted to a learning model (e.g., SVM or HMM) for training and testing. Regarding the deep learning-based approach, the model itself can decide feature points (that is, the feature point extraction has been incorporated into the module), so the image can be directly transmitted to the deep learning model (e.g., multilayer perceptron (MLP), deep neural network (DNN), convolutional neural network (CNN), recurrent neural network (RNN) and the like). Afterwards, training and testing are carried out. The deep learning and machine leaning technologies are well known in the art, so detailed descriptions thereof will be omitted here. It should be understood, however, that the disclosure is not limited thereto, and any existing or yet-to-be developed human and human face detection methods are also applicable to the invention.

Through the specification and claims, the following notations/terms take the meanings explicitly associated herein, unless the context clearly dictates otherwise. The term "framing a ROI" refers to defining an effective range for a ROI (i.e., a sub-scene) in a panoramic image by a selection frame/border. Please note that the rectangular selection frames/borders 301~305 in FIG. 3B-3E are provided by way of example, but not limitations of the invention. Thus, any other shapes of selection frames may be used. The term "priority" is meant to be understood broadly as an order of inserting a ROI into a corresponding window in one output frame layout. In one example, the higher the priority, the earlier the ROI is inserted into its corresponding window for display. In one example, the priority may be a range from 1 to 5, where 1 indicates the lowest priority and 5 indicates the highest priority. In another example, the priority may be a range from A to C, where C indicates the lowest priority and A indicates the highest priority.

As shown in FIG. 3B, the ROI 302 of the leftmost whiteboard cannot be automatically detected by the human detection or the human face detection, but allows to be manually selected/framed by the user. After one or more of ROIs 301 and ROIs 302 has been selected, their selection frames can be dragged, zoomed in and zoomed out. Besides, the number of the selection frames can be further increased or decreased after the ROIs 301 and ROIs 302 have been selected. Furthermore, the ROIs 301 and 302 can be moved to the desired positions and ranges. Please note that in addition to the ROI 302 of the leftmost whiteboard that is manually selected by the user, a ROI of a whiteboard, a curtain or a television may be detected/identified by any known methods. Besides, all the attributes of the ROIs 301 and 302 selected in this step are defined as "static." That is, sizes and positions of the ROIs 301 and 302 do not vary as the characters in the section frames move.

Figure 3C:
Figure 3C:
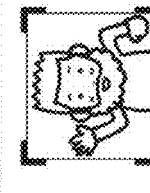
Figure 3C:
Figure 3C:
Figure 3C:
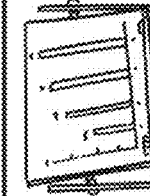

Step S206: Select a ROI for object tracking according to the user's requirements or preferences. The ROI(s) for object tracking is mainly selected from the static ROIs already selected in the step S204. In the examples of FIGS. 3B and 3C, the user selects one or more of the ROIs 301 and 302 (selected in the step S204) as the ROI(s) 303 for object tracking. Please note that in this step, the attribute of the ROI 303 is defined as "dynamic" or "tracking." That is, the position of the ROI 303 varies and moves as the character in the frame moves.

Figure 4A:
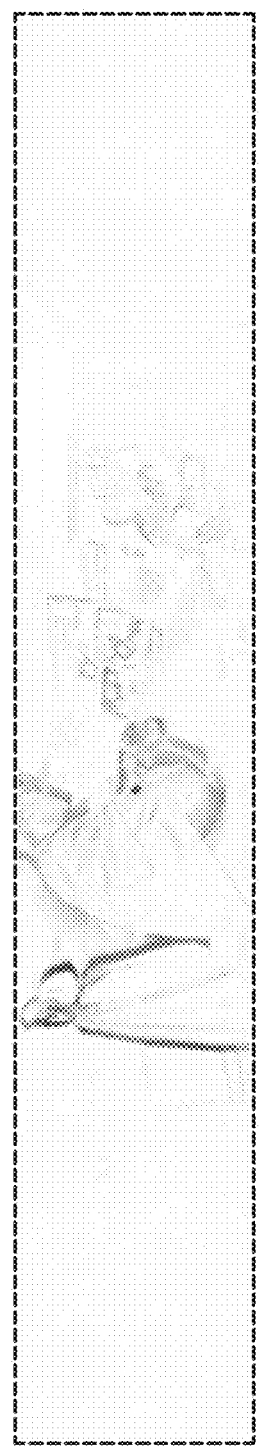
FIGS. 4A and 4B respectively show color-inverted images for an exemplary difference image and an example of grouping multiple difference regions.
Figure 4B:
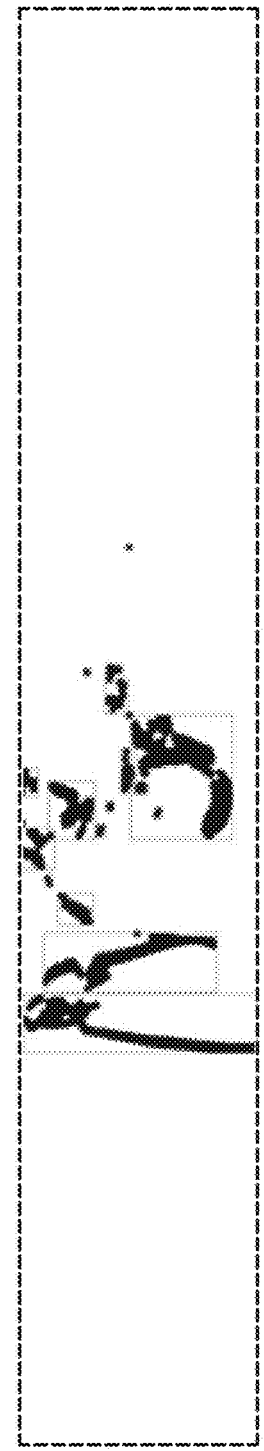

In this step, the following four tracking methods are used to perform object tracking (e.g., tracking the character in the ROI 303 of FIG. 3C). (1) Feature Extraction Method: feature extraction is performed in a sequence of: inputting a ROI 303, detecting corners, and outputting multiple corner points. Tracking is performed in a sequence of: inputting feature points, calculating a motion vector of each feature point by performing optical flow/mean shift/motion estimation, determining a motion vector of each group, and determining a motion vector of the ROI 303. (b) Human Pose Estimation: any existing or yet-to-be developed human pose estimation method is operable. For example, defining a human body structure by main joints and connections thereof of the human body. As an example, key points (main joints) of each human body are identified by part intensity field (PIF), and then the key points are connected into an integral human body model by part association field (PAF). Next, inserting the human body structure into the ROI 303 and then aligning the human body structure with the human's pose in the ROI 303. (c) Foreground Detection Method: The foreground detection method (i.e., moving the ROI 303 using its foreground) is performed in sequence as follows. (c1) Smoothing a frame. (c2) Computing a difference image between a currently smoothed frame and a previously smoothed frame (see FIG. 4A). Please note that FIGS. 4A and 4B respectively show "color-inverted" images for an exemplary difference image and an example of grouping multiple difference regions. Because objects move usually in a progressive manner, significant differences only exist in object edges. The materials in the middle portion have the same color, so the differences in the middle portion are small, which makes a difference image of a moving object appear as an outline composed of "lines." The difference image is a grayscale image with different shades, and no clear connection is visible between points. (c3) Binarizing the difference image in order to clarify the range of the object. (c4) Grouping multiple difference regions. For example, perform dilation and erosion operations over the binarized difference image (the processed result is shown in FIG. 4B). (c5) Moving the ROI 303 to cover the difference regions if the grouped difference regions and the ROI 303 overlap. (d) Performing feature comparison and tracking using a scale-invariant feature transform (SIFT) or histogram of oriented gradient (HOG). Since the above four detection tracking methods are well known in the art, their detailed descriptions are omitted herein. Please also note that the four detection tracking methods are only provided by way of examples, but not limitations of the invention. Any existing or yet-to-be developed detection tracking methods can be used.

Step S208: Detect a speaking or talking ROI. The following two methods are used to detect whether someone is speaking or talking according to the three types of ROIs 301~303. In the first method, a microphone array is used to compute beamforming and direction-of-arrival (DOA) estimation, thereby generating a possible direction of sound source. The DOA estimation method includes, but is not limited to, a maximum likelihood (ML) method, a time delay estimation (TDE) method, an eigenstructure method and the like. In the second method, a microphone array is used to select a larger sound source. Take a microphone array including four microphones respectively having DOAs of 0, 90, 180 and 270 degrees as an example. Two microphones that respectively have the DOAs of 90 and 180 degrees and receive two higher audio power levels of 50 and 60 decibels are selected from the microphone array for interpolation to determine an interpolated possible direction of sound source. After the decibels are converted into audio power levels, the audio power level corresponding to 180 degrees is ten times of the audio power level corresponding to 90 degrees. Thus, the interpolated possible direction of sound source is calculated as (180*10+90*1)/11~=172 degrees. In actual implementations, to facilitate the subsequent comparisons of the HAFOVs and the DOAs, the lenses and microphone arrays of the wide-angle webcams (110a, 110b) need to be properly arranged/set up such that the HAFOVs (ranging from 0 to 360 degrees) of the generated panoramic images exactly match the DOAs (ranging from 0 to 360 degrees) of the microphones. For example, the HAFOV of 0 degrees for the panoramic images matches the DOA of 0 degrees for the microphones while the HAFOV of 180 degrees for the panoramic images matches the DOA of 0 degrees for the microphones.

In this step, it is assumed that the three ROIs 301~303 have been already selected in the process of detecting whether there is an attendee speaking in the meeting room, so the HAFOVs for the ROIs 301~303 are known. After the microphone array detects someone is speaking and determines a possible direction of sound source, if an angle difference ($\theta - \theta_S$) between the HAFOV $\theta$ for one of the ROIs 301~303 and the possible direction of sound source $\theta_S$ is smaller than a threshold value $\theta_{T1}$, the ROI with the angle difference smaller than the threshold value $\theta_{T1}$ is defined as the currently speaking ROI as shown in an ROI 304 of FIG. 3D. If there are two ROIs 301~303 simultaneously located near the possible direction of sound source and both their angle differences are smaller than the threshold value $\theta_{T1}$, then the ROI with the minimum angle difference (i.e., the nearest ROI) would be selected as the currently speaking ROI 304. Please note that the attribute of the ROI 304 selected in this step is defined as "speaking."

Step S210: Perform face recognition over the ROIs 301 (already detected by human detection and/or human face detection), and automatically mark their names on their selection frames. The face recognition method used in this invention includes, but is not limited to, performing face recognition over image feature points based on scale-invariant feature transform (SIFT), performing face recognition over image feature points based on speeded up robust features (SURF), performing face recognition over local binary patterns histogram (LBPH) (functioning as image feature points), and analyzing Eigenface of the data based on principal components analysis (PCA) together with Fisherface of linear discriminant analysis (LDA). The above-mentioned theories may be adopted to train a model by learning from the known samples and finding the classification method, and the trained model can be used for face recognition. Alternatively, the face recognition may be performed using a deep learning-based model (e.g., MLP, DNN, CNN, RNN and the like). In this step, the face recognition may be performed over the known samples using a pre-trained model; moreover, a celebrity face recognition may be synchronously implemented in the addition of a web crawler technology. Referring to a recognition frame 305 in FIG. 3E, please be noted that an attribute of ROI 305 selected in this step is defined as "recognized." Because this step is optional, this step is shown by dashed lines in FIG. 2A.

Figure 5:
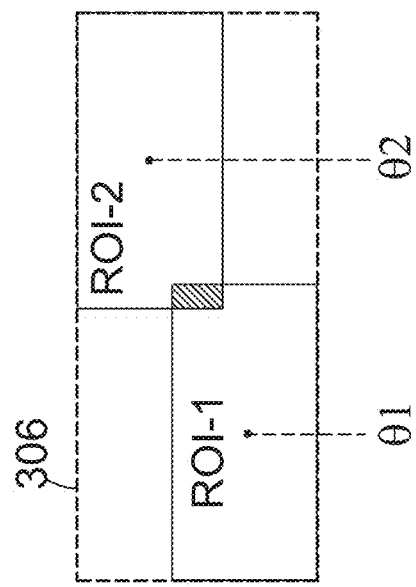
FIG. 5 shows conditions and a method for merging ROIs in this invention.

Step S212: Merging ROIs when a predetermined condition is satisfied. When the image display method of this invention proceeds to this step, the following data have been already generated: (a) the panoramic image 310; and (b) multiple ROIs with different attributes, such as the "static" ROIs 301~302, the "dynamic" ROI 303, the "speaking" ROI 304 and the "recognized" ROIs 305. FIG. 5 shows conditions and a method for merging ROIs in this invention. When the ROIs are inserted into multiple windows in an output frame layout, in order to prevent some characters or objects from being repetitively displayed, the present invention merges at least two ROIs if the at least two ROIs satisfy one of the following two conditions: (i) The HAFOVs for center points of the at least two ROIs are determined relatively close. For example, when the HAFOV difference ($\theta 1 - \theta 2$) between the center points of ROI-1 and ROI-2 (selected from ROIs 301~305) in FIG. 5 is smaller than a predetermined angle $\theta_{T2}$, merge ROI-1 and ROI-2, where $\theta_{T2} = 10°$. (ii) There are either at least one overlapped region or overlapped pixels between the at least two ROIs. For example, if there are either at least one overlapped region or overlapped pixels between ROI-1 and ROI-2 (selected from the ROIs 301~305), merge ROI-1 and ROI-2. As to the merging method, the union of the two merged ROIs extends from the top border to the bottom border and from the left border to the right border of the two merged ROIs. For example, the ROI-1 and ROI-2 are merged into a dashed-bold-line rectangular frame ROI 306 in FIG. 5. Please note that each ROI may correspond to one or more attributes, and that in the subsequent steps, the attributes of the merged ROI 306 may be defined as "merged," "multiple-person," or "the number of persons (e.g., two persons)". Please also note that in the subsequent step S216, the merged ROI 306 together with both ROI-1 and ROI-2 (before merging) would be considered whether to be inserted into corresponding windows of an output frame layout to generate a composite frame 320.

Step S214: Selecting one from multiple predetermined frame layouts as an output frame layout according to the attributes, the positions and the numbers of the ROIs 301~306, and whether to insert a portion of the panoramic image. The predetermined frame layouts of this invention include, but are not limited to, compose layouts A and B (e.g., FIGS. 6A and 6B), a focus layout (e.g., FIG. 6C), a grid layout (e.g., FIG. 6D), a picture-in-picture (PIP) layout (e.g., FIG. 6E), a speaker layout (e.g., FIG. 6F) and a top-down layout (e.g., FIG. 6G).

FIGS. 6A to 6F show different predetermined frame layouts in this invention. Different attributes and numbers of ROIs are suitable for different predetermined frame layouts, and different predetermined frame layouts provides different presentations suitable for different numbers of attendees, different personnel distributions or different scenes. Please note that each predetermined frame layout includes one or more windows having the same or different dimensions and aspect ratios. For example, the compose layout A in FIG. 6A includes three windows having different dimensions and aspect ratios while the top-down layout in FIG. 6G includes two windows having the same dimension and aspect ratio.

Figure 6B:
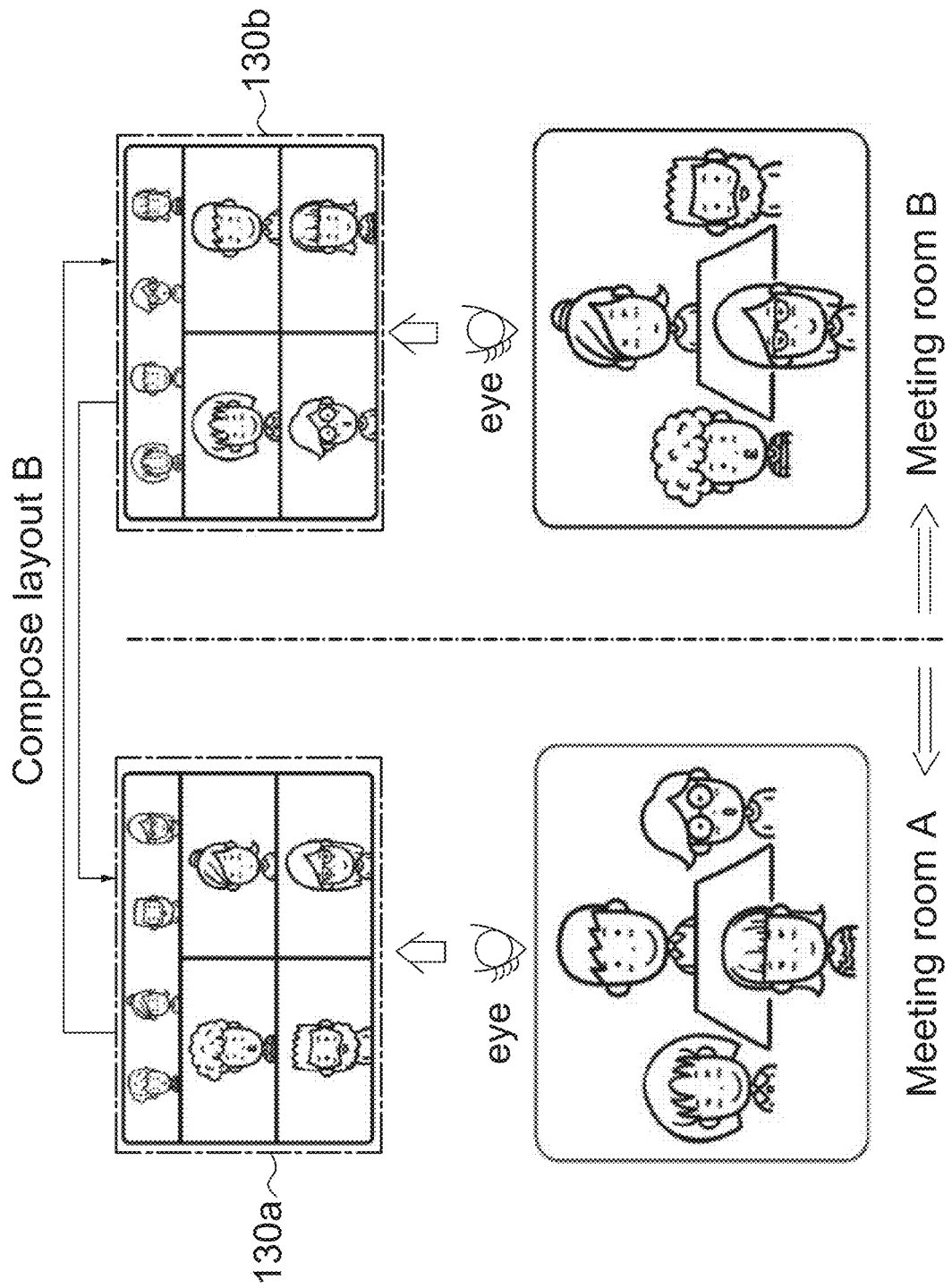
Figure 6C:
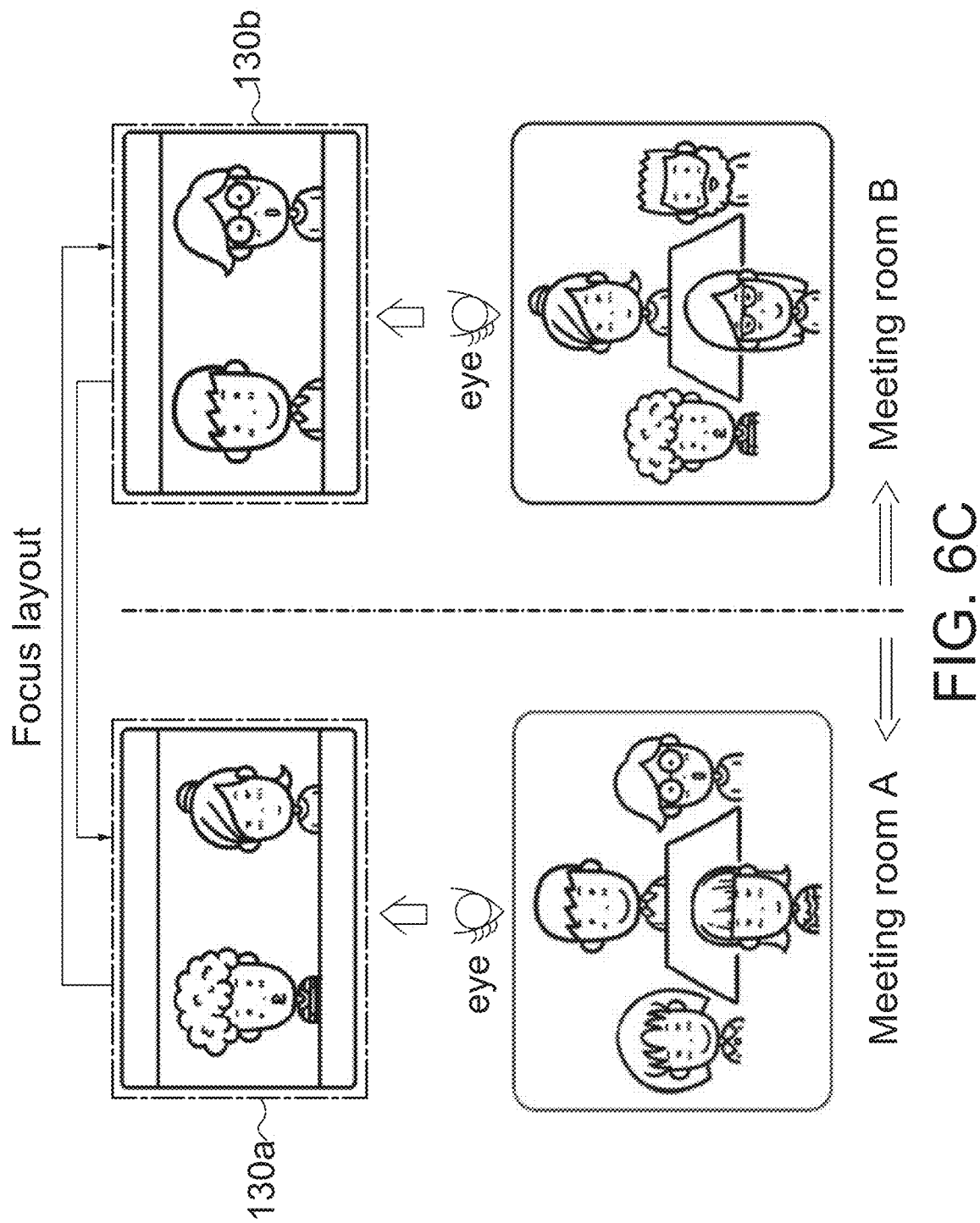
Figure 6D:
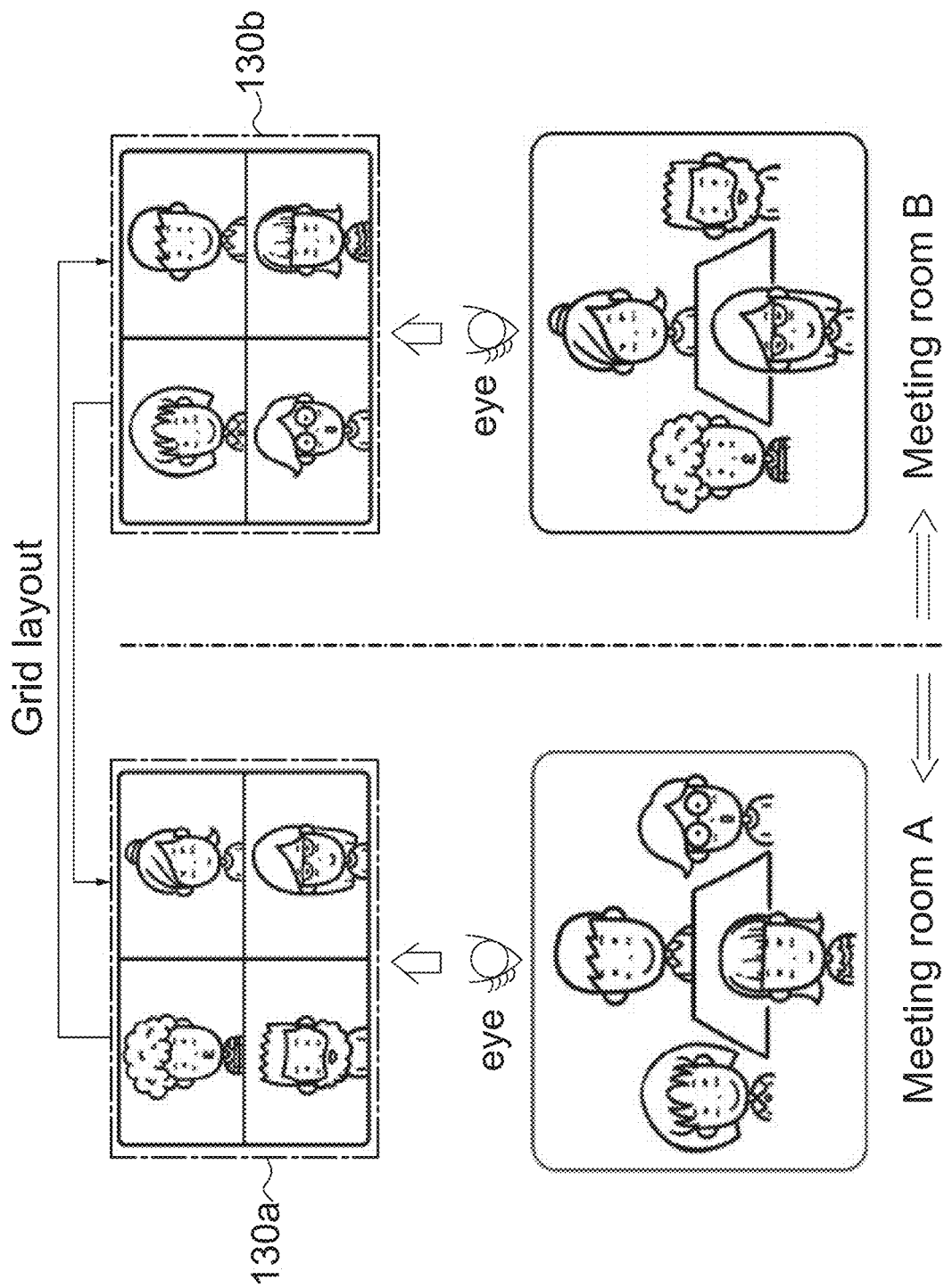

FIGS. 6A and 6B show two compose layouts A and B suitable for a condition that there are many ROIs and multiple key characters. In each of the compose layouts A and B, a panoramic image (all attendees are visible) is composited entirely across an upper part of the layout, multiple key characters are respectively presented in two or more windows at a lower part of the layout, and the two or more windows does not necessarily have the same dimension and aspect ratio. It is noted that in each of the compose layouts A and B, the panoramic image composited across the upper part of the layout is not limited to a full panoramic image, but also to a portion of the panoramic image as long as all attendees are visible. In one embodiment, the user may freely adjust the to-be-presented portions/window on the upper part of each of the compose layouts A and B. In one embodiment, multiple split windows on the lower part of each of the compose layouts A and B can be used to show up to eight key characters. FIG. 6C shows the focus layout suitable for multiple adjacent ROIs whose positions occupy only a portion of the overall 360 degrees. For example, in the focus layout, multiple adjacent ROIs (located at relatively close positions) can be selected and framed by a large selection frame, or alternatively, multiple speaking ROIs occurring within a specific period can be selected and framed by a large selection frame. FIG. 6D shows a grid layout suitable for a first scene having a larger amount of important and distributed ROIs (with the highest priority or/and the second highest priority) or for a second scene having fewer unimportant ROIs without showing the panoramic image. In this grid layout, multiple grouped ROIs are arranged in a form of neat multi-window grid. The grid does not necessarily have four windows or even-numbered windows. In the example of FIG. 6D, four windows respectively show four attendees; whenever a new speaker joins the meeting, the attendee who has been silent for the longest time in the meeting is directly replaced with the new speaker.

Figure 6E:
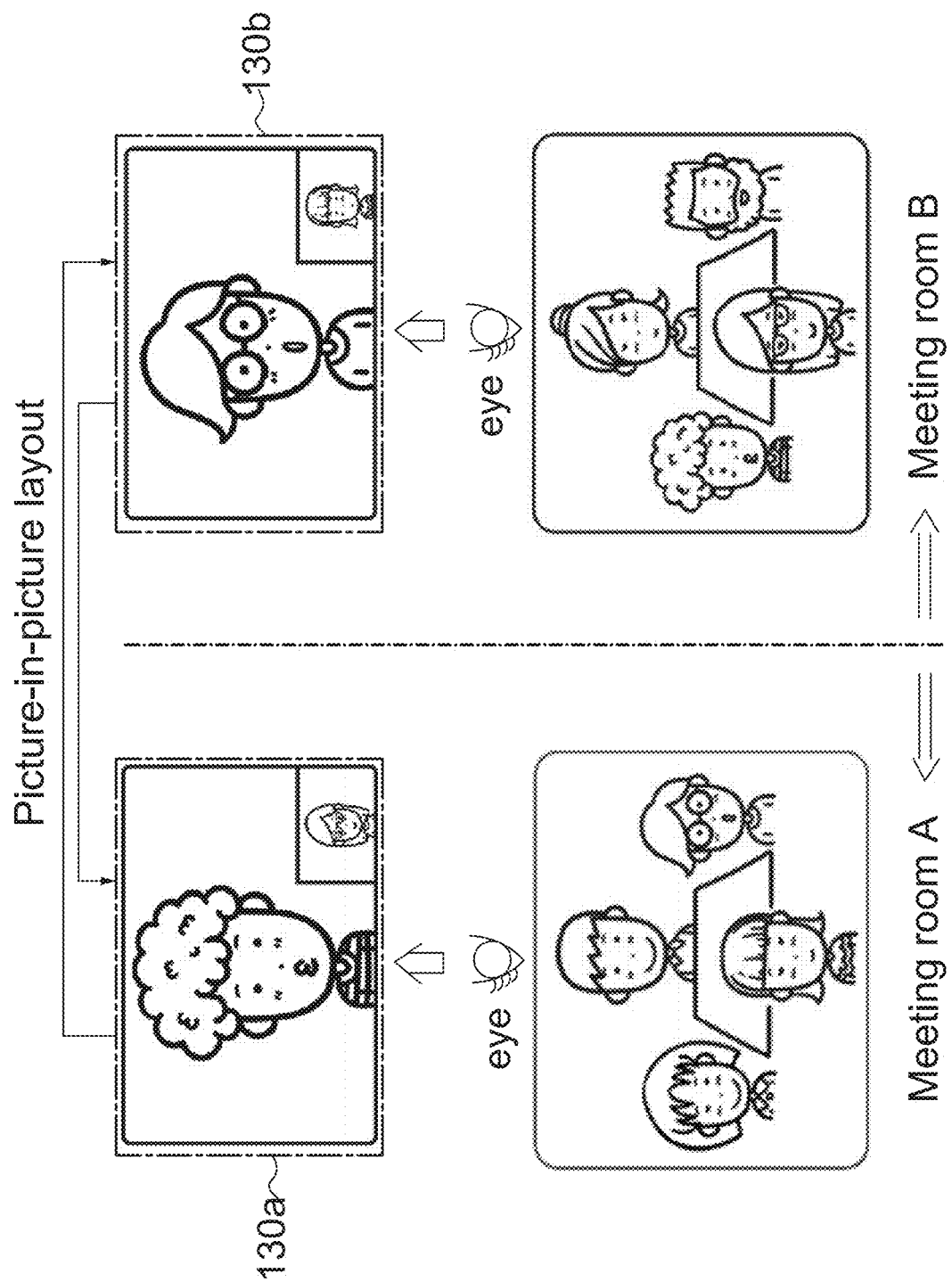
Figure 6F:
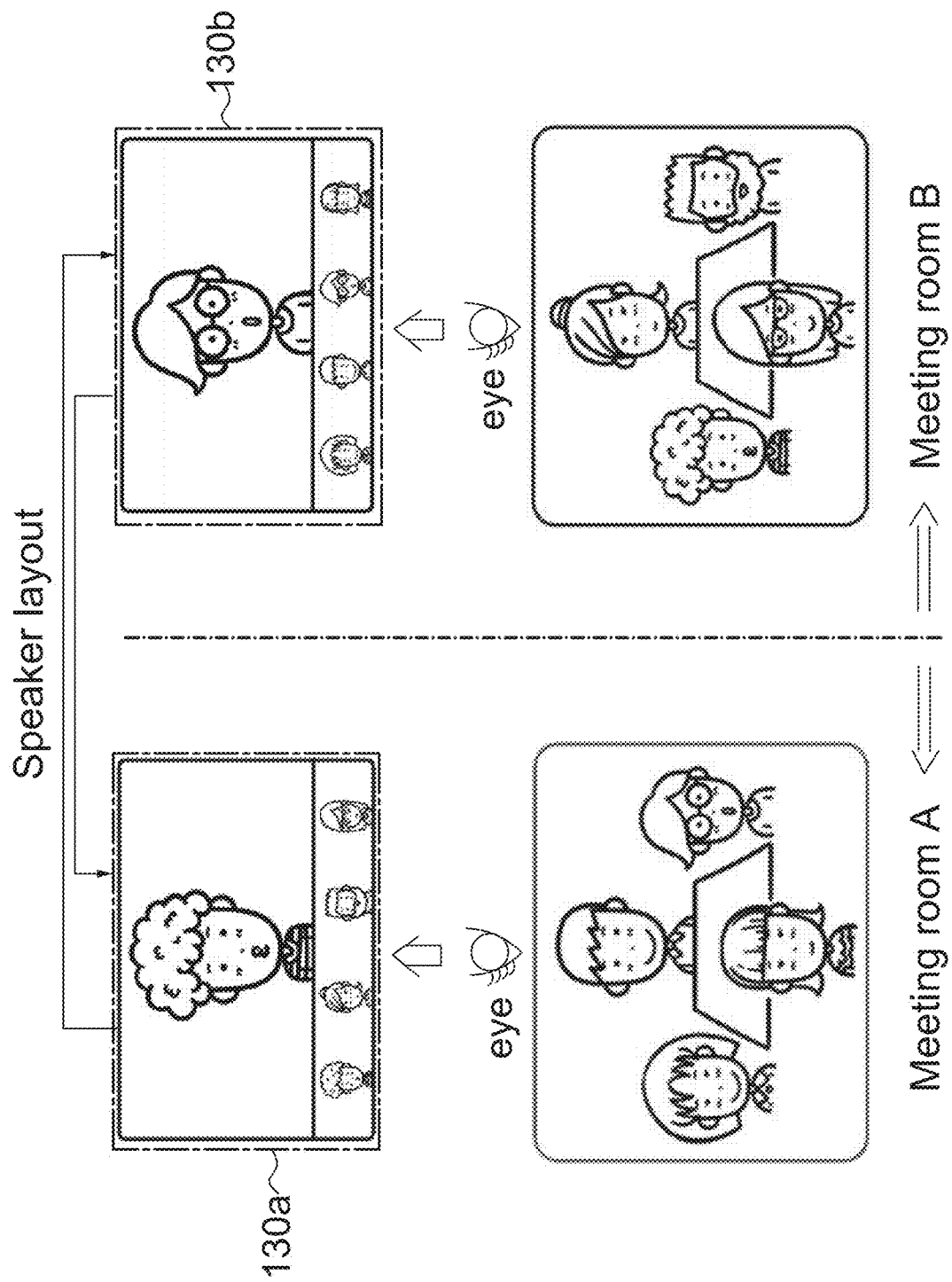
Figure 6G:
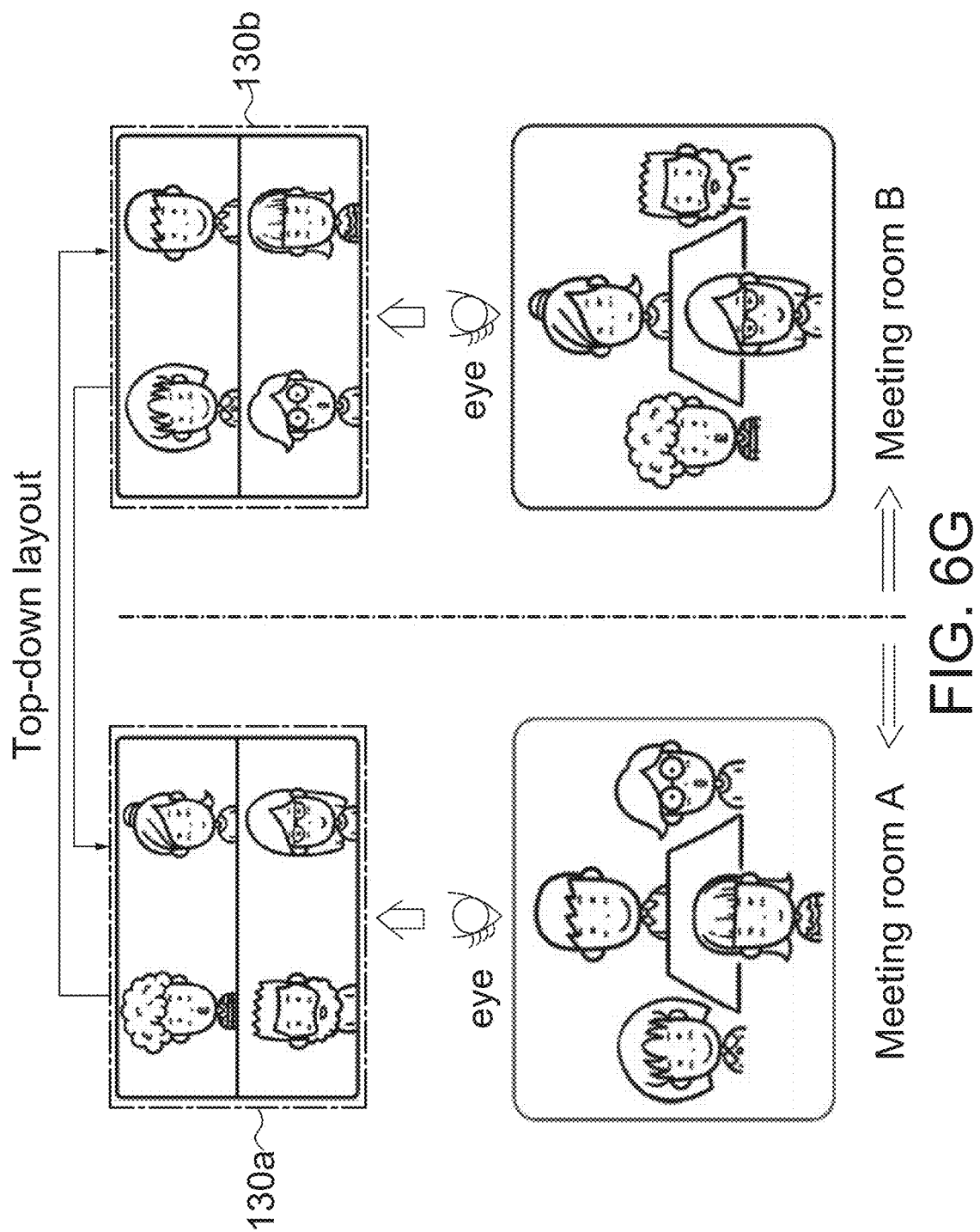

FIG. 6E shows a picture-in-picture (PIP) layout suitable for a scene having a larger ROI 302 (e.g., a whiteboard, a curtain or a television) and at least one attendee. In the PIP layout, a larger window is used to display a ROI containing a whiteboard, a curtain, a television or a speaker while a smaller window is used to display a ROI containing a lecturer or a questioner. FIG. 6F displays the speaker layout suitable for a scene having a larger number of attendees and only one main speaker. In the speaker layout, a panoramic image is composited entirely across the lower part of the frame 320 while the speaker ROI 304 is composited to occupy the upper part of the frame 320. If someone is asking and the speaker has been silent for a period of time, then the speaker's ROI is composited into the larger window on the upper part of the layout. FIG. 6G shows the top-down layout suitable for a scene where no ROI needs to be particularly displayed. In the top-down layout, a first half portion and a second half portion of the wide-angle panoramic image are respectively inserted into the top and bottom windows of the composite frame 320. It is likely that portions of the top and bottom edges of the panoramic image are removed or cut off during the insertion process in order for the composite frame 320 to satisfy the required aspect ratio while the video software displays the composite frame 320. For example, assuming that the wide-angle panoramic image has the aspect ratio of 6:1 and the video software requires the composite frame 320 to have the aspect ratio of 16:9 (i.e., the ratio is about 1.78) for display, if two halves of the panoramic image are decided to be respectively displayed in the top and bottom windows of the composite frame, the aspect ratio is equal to 3:2 (i.e., the ratio is about 1.5). On condition that the widths of the two halves of the panoramic image are fixed and both the top edge of a first half of the panoramic image and the bottom edge of a second half of the panoramic image are uniformly cut off/removed for insertion into the top and the bottom windows of the composite frame 320, about 7.8 percent of each of the top edge of the first half and the bottom edge of the second half would be cut off.

In this step S214, one of multiple predetermined frame layouts is selected as an output frame layout according to at least one of the attributes, the positions and the number of the ROIs 301~306 and whether to insert a portion of the panoramic image. For example, if a portion of the panoramic image is to be inserted, the compose layouts A and B, the speaker layout or the top-down layout may be selected; if a large ROI (containing a whiteboard or a screen) is required for description (serving as lecture notes), the picture-in-picture layout can be selected; if there is only one speaking ROI (i.e., one single speaker), the speaker layout can be selected; if there are multiple speaking ROIs (i.e., multi-person discussion), the compose layouts A and B, the grid layout or the focus layout may be selected; if the positions of multiple ROIs in the panoramic image are relatively close, the focus layout may be selected; if the positions of the ROIs in the panoramic image are relatively distributed, the grid layout may be selected.

Step S216: Insert the ROIs (301~306) or/and at least one portion of the panoramic image into the corresponding windows of the output frame layout according to the attributes of the ROIs 301~306 to generate the composite frame 320. It should be noted that the aspect ratios of each ROI (301 to 306) and the at least one portion of the panoramic image are not necessarily equal to the aspect ratios of their corresponding windows, so the aspect ratios of ROIs and the at least one portion of the panoramic image need to be adjusted before insertion. In one embodiment, in addition that the panoramic image is required to be firstly inserted into its predetermined corresponding window in the compose layouts A and B, the speaker layout and the top-down layout, the ROIs are respectively inserted into their corresponding windows of the output frame layout according to the attributes of the ROIs for all the frame layouts. For example, if each ROI corresponds to only one attribute, among all attributes of the ROIs 301~306, the "speaking" attribute gets the highest priority, the "merged," "multiple-person" or "more than one person" attribute gets the second highest priority, the "dynamic" attribute gets the third highest priority, and the "static" and the "recognized" attributes get the lowest priority. In principle, in consideration of the limited space of the output frame and the limited number of the windows, each output frame layout firstly displays the "speaking" ROI having the highest priority. If there is a first remaining window to be inserted in the output frame layout, the "merged," "multiple-person" or "more than one person" ROI having the second highest priority would be then displayed by the first remaining window. If there is still a second remaining window to be inserted, the "dynamic" ROI having the third highest priority would be then displayed by the second remaining window. Finally, if there is yet still a third remaining window to be inserted, the "static" and "recognized" ROI having the lowest priority would be then displayed by the third remaining window. On the contrary, if there is no available window to be inserted in the output frame layout, the "static" and "recognized" ROIs would be discarded in the first place. In another embodiment, each ROI corresponds to more than one attribute, and different attributes have different priorities. For example, a "pinning" attribute gets the highest priority A, the "merged," "multiple-person" or "more than one person" attribute gets a priority B, and other attributes get the lowest priority C. However, the attributes having the same priority C can be further divided into different priority levels. For example, the "speaking" attribute having the highest priority is assigned C3, the "dynamic" attribute having the second highest priority is assigned C2, and the "static" and the "recognized" attributes having the lowest priority is assigned C1. In other words, a ROI including the "pinning" attribute definitely gets the priority A no matter whether the ROI further includes other attributes; a ROI excluding the "pinning" attribute and including the "merged," "multiple-person" or "more than one person" attribute definitely gets the priority B; and the other ROIs only including the remaining attributes get the priority C.

According to this invention, the "pinning" attribute is directly assigned the highest priority. In other words, a ROI having the "pinning" attribute would be definitely selected and inserted into its corresponding window in each output frame layout. In addition, the "pinning" attribute is an attribute relying on the user's manual selection, that is to say, the user can decide whether to assign the "pinning" attribute to a ROI and remove the "pinning" attribute from the ROI by himself/herself. It should be noted that the number of the ROIs having the "pinning" attribute varies in each output frame layout according to the properties of each output frame layout (e.g., a panoramic image needs to be inserted; a picture needs to be explained; one single speaker; multiple persons discussion). For example, assuming that only four ROIs having the "pinning" attribute allow to be inserted into one predefined output frame layout, when the user assigns the pinning attribute to a fifth ROI, the pinning attribute will be immediately removed from the first (i.e., the oldest) pinning ROI. On the other hand, four ROIs, e.g., having the priorities of 1A1B2C (i.e., one ROI having the priority A, one ROI having the priority B and two ROIs having the priority C), can be selected for insertion/display in each output frame layout according to the property of each output frame layout and the user preferences. Because ROIs having the priority A or B is inevitably few, there is no need to further divide the ROIs having the priority A and to further divide the ROIs having the priority B. Due to various classes and a larger amount of the ROIs having the priority C, the ROIs having the priority C need to be sequentially inserted into their corresponding windows in each output frame layout in order of their priorities, that is, from the highest to the lowest.

In one embodiment, each ROI corresponds to more than one attribute and different attributes have different priorities. For each output frame layout, multiple ROIs are sorted in order of their priorities to generate a sorted ROI string, and then sequentially inserted into the corresponding windows. Also, in the sorting process of comparing the priorities of the multiple ROIs, the highest priority among all attributes for each ROI is taken/retrieved as a delegate priority of each of the ROI for comparison with other ROIs. If two or more ROIs have the same delegate priority, then their second highest priorities are compared, and so on, until the priorities of all ROIs have been sorted (hereinafter called "one-by-one comparison"). For example, ROI-1 has four attributes with four priorities (5,4,2,1), and ROI-2 has three attributes with three priorities (5,4,3). Because the former two priorities (5,4) of ROI-1 and ROI-2 are the same and the third highest priorities of ROI-1 and ROI-2 are different, ROI-2 finally takes priority over ROI-1. As another example, ROI-3 has four attributes with four priorities (5,4,2,1) and ROI-4 has three attributes with three priorities (5,4,2). Because the former three priorities of ROI-3 and ROI-4 are the same, the comparison needs to continue. Next, since ROI-3 has the fourth priority but ROI-4 does not, ROI-3 finally takes priority over ROI-4. As such, the same process of taking the highest priority is also applicable to the case of one ROI including multiple ROIs.

Likewise, in another embodiment, each ROI corresponds to more than one attribute and different attributes have different priorities; moreover, for each ROI, the priority values of all attributes need to be firstly added up to obtain a sum priority. Then, the ROIs are sorted in order of their sum priorities. In the process of comparing the sum priorities of the ROIs, if there are two or more ROIs having the same sum priority, the one-by-one comparison is used to compare, starting from their highest priorities (set to delegate priorities of ROIs), and then their second highest priorities (again set to delegate priorities of the ROIs), and so on, until the priorities of all ROIs have been sorted to generate a sorted ROI string (hereinafter called "summation with one-by-one comparison"). Finally, the ROIs are sequentially inserted into the corresponding windows according to their sum priorities, that is, from the highest to the lowest.

In another embodiment, each ROI corresponds to more than one attribute, all attributes are divided into multiple levels, and the attributes at the same level are further divided into multiple classes. For example, all attributes are divided into three levels X, Y, Z with three level priorities (10, 5, 1). In addition, the level of the attribute Y is further divided into two classes (Y1, Y2) with their class priorities (6, 7). In each output frame layout, the ROIs are firstly sorted according to the level priorities. In the sorting process of comparing the level priorities of the ROIs, after a highest level priority is selected/determined among all attributes for each ROI, the highest level priorities of all ROIs are compared with each other. If two or more ROIs have the same highest level priority, then either the one-by-one comparison or the summation with one-by-one comparison is performed to compare the class priorities of attributes at the same level (e.g., Y1 and Y2 are compared). If the class priorities of the attributes at the same level are also the same, then the level priorities of attributes at the next level (i.e., a lower lever) are compared, and so on, until the priorities of all ROIs have been sorted to generate a sorted ROI string (hereinafter called "level/class comparison"). Finally, the ROIs are sequentially inserted into the corresponding windows in order of their level and class priorities, that is, from the highest to the lowest.

In addition, according to this invention, if a ROI is inserted into a specific window without affecting aesthetics of the output frame/picture, the ROI is assigned a priority S for this specific window. Example one: if the difference between the scales of a ROI and its corresponding window falls within a predetermined range (e.g., ranging from 0.5 to 1.5 times) and scaling the ROI up/down too far does not have impact on image clearness, then the ROI is assigned the priority S for the corresponding window. Example two: if the aspect ratios of the ROI and its corresponding window are different and it is impossible to extend the range of the selection frame for the ROI to cause the ROI and its corresponding window to have the same aspect ratio (i.e., the border of the selection frame for the ROI would eventually touch the top edge of the panoramic image in the process of extending the selection frame of the ROI as shown in FIG. 7C), then the ROI is not assigned the priority S, otherwise, the ROI is assigned the priority S for the corresponding window. In one embodiment, if all windows in one output frame layout select ROIs having the priority S, one ROI additionally having a "most suitable scale" attribute and/or a "most suitable aspect-ratio" attribute would take priority over the other ROIs having the priority S and be inserted into its corresponding window to achieve the effects of resolution uniformity or attendee size uniformity in the screen, and thus to glorify the output frame layout. In another embodiment, assuming that one of the windows in one output frame layout needs to select a ROI with the priority S, at first, a ROI-a with the priority A and a ROI-b with the priority B are found by one of the three comparison methods (i.e., the one-by-one comparison, the summation with one-by-one comparison and the level/class comparison); next, if the difference between the priorities of the ROI-a and the ROI-b is less than a threshold value TH, one of the ROI-a and the ROI-b with the priority S would take priority over the other ROI without the priority S for insertion into the one window. Thus, the flexibility of the threshold value TH can be retained. In other words, the greater the threshold value TH, the more important the user feels about the priority S.

Figure 7B:
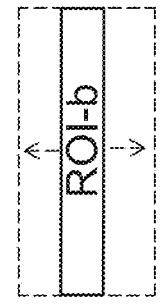
FIGS. 7A to 7E are schematic views showing inserting ROIs and panoramic images with various aspect ratios into their corresponding windows with various aspect ratios in output frame layouts according to this invention.
Figure 7A:
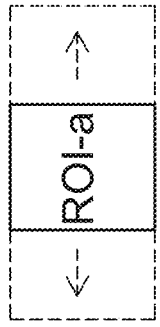
Figure 7C:
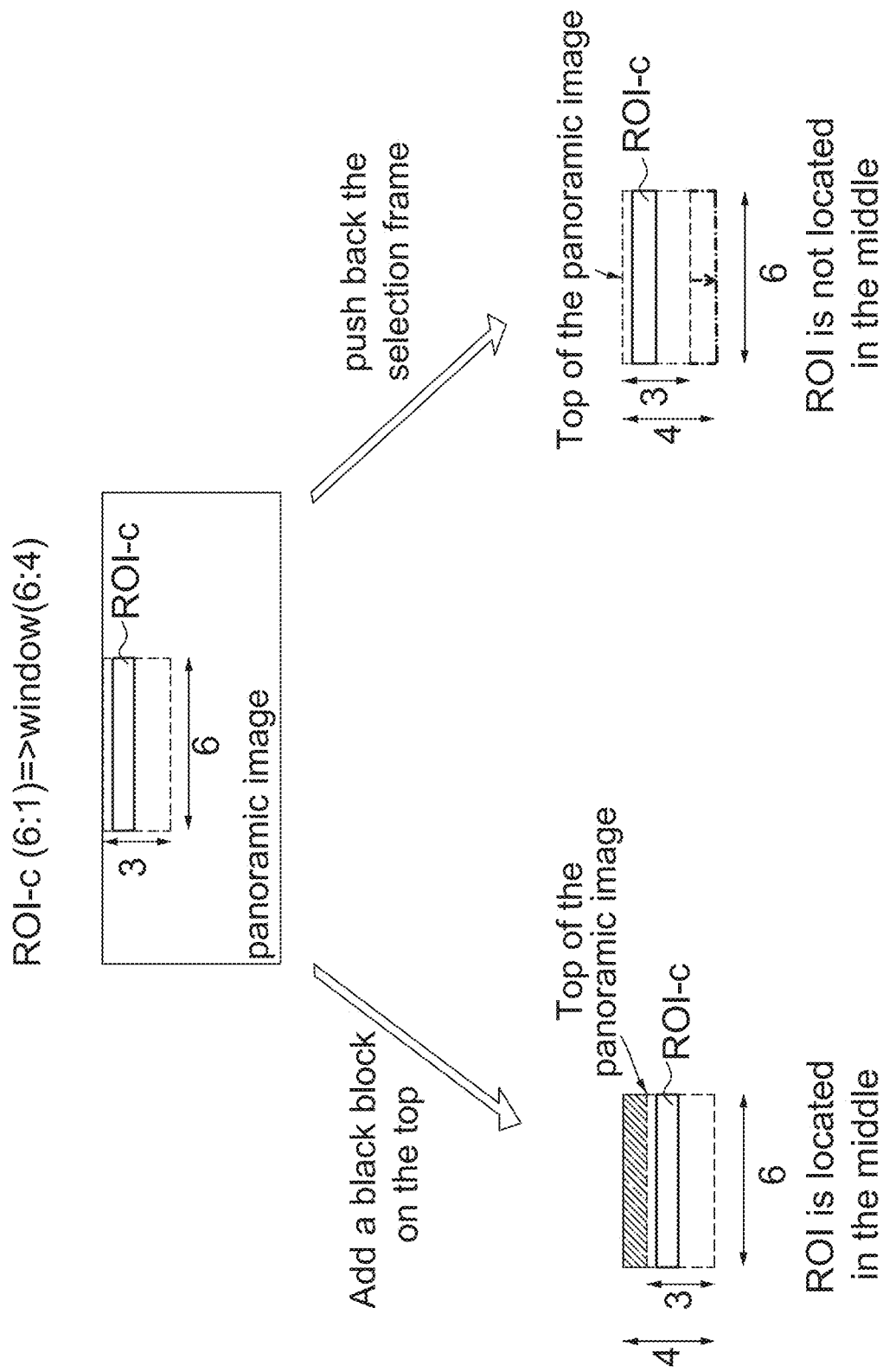
Figure 7D:
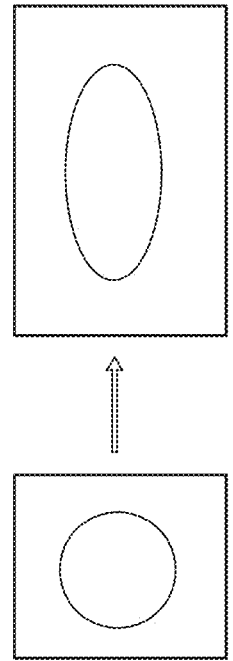
Figure 7E:
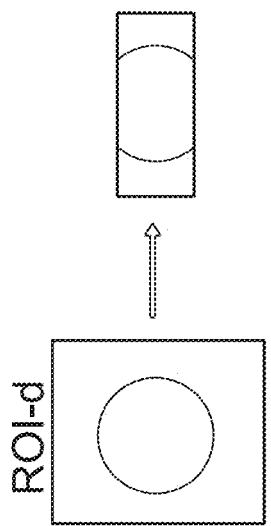

FIGS. 7A to 7E are schematic views showing how to insert ROIs and panoramic images with different aspect ratios into corresponding windows with different aspect ratios in an output frame layout according to this invention. There are totally four methods for inserting ROIs and panoramic images with different aspect ratios into corresponding windows with different aspect ratios in an output frame layout. In the first method, if the range of the selection frame for an ROI in the panoramic image is extendable, then the range of the selection frame is extended leftward, upward, rightward or downward to cause the aspect ratio of the selection frame to satisfy the aspect ratio of the corresponding window. In the example of FIG. 7A, the ROI-a has the original aspect ratio of 3:4, and then its selection frame is extended leftward and rightward to satisfy the aspect ratio of 16:9 of its corresponding window. In the example of FIG. 7B, the ROI-b has the original aspect ratio of 6:1, and then the selection frame is extended upward and downward to satisfy the aspect ratio of 6:3 of its corresponding window. In the second method, the range of the selection frame for a target ROI in the panoramic image is extended as far as it can be; however, if the range is not extendable, then the superfluous image in the ROI is cut off/removed according to the aspect ratio of the corresponding window, as shown in FIG. 7D. In the third method, in the process of extending the range of the selection frame for a target ROI, it is impossible for the range/boundary of the selection frame to cross any edge of the panoramic image. In this scenario, the following two approaches are provided. In the first approach, the selection frame is pushed back from the hindered edge of the panoramic image to satisfy the aspect ratio of the corresponding window. In the second approach, a black block is added above the top of the selection frame to satisfy the aspect ratio of the corresponding window. In the example of FIG. 7C, the ROI-c has the original aspect ratio of 6:1, and then its selection frame is extended upward and downward to barely reach the aspect ratio of 6:3, which is still different from the target ratio of 6:4. At this moment, the first approach is used to push back the selection frame downward from the top of the panoramic image so that the range of the selection frame is able to finally match the corresponding window with the aspect ratio of 6:4. The result of the first approach is shown in the bottom-right corner of FIG. 7C. Although the original ROI is located in the upper middle part of its corresponding window, the whole contents of the panoramic image are fully displayed, resulting in a more natural picture. Alternatively, in the second approach, in order to satisfy the aspect ratio of 6:4 of the corresponding window, a black block with the aspect ratio of 6:1 is added right above the top of the selection frame (6:3) that is unable to be further extended. The result of the second approach is shown in the bottom-left corner of FIG. 7C, the original ROI can be located in the middle of its corresponding window. In the fourth method, if the range of the selection frame in the panoramic image cannot be extended and the superfluous image in the ROI cannot be cut off, then the image in the ROI is directly deformed according to the aspect ratio of the corresponding window as shown in FIG. 7E, where a circle is deformed into an ellipse.

Step S220: Transmit the composite frame 320 to a video software for display. For example, in FIG. 1, the communication device 130a executes a video software A to transmit the composite frame A from the video switcher 120a to the communication device 130b, receives the composite frame B from the communication device 130b through the network, and displays the composite frame B. The composite frame 320 transmitted to the video software satisfies the aspect ratio or/and the number of pixels that are specified by the existing video software. The video software includes various video conferencing software and various webcam application software. The various video conferencing software include, but is not limited to, ZOOM cloud meeting, Skype, Tencent Meeting, Cisco WebEx meeting, Line, V-cube meeting, Google meet and the like. After the composite frame 320 is outputted to various webcam application software, the composite frame 320 can be used for live broadcasting, meeting record production, clip sharing and the like.

Please note that the communication devices 130a and 130b in FIGS. 6A to 6G display the same frame layout for the ease of illustration. In the actual implementations, the image display method of this invention executed by the video switchers 120a and 120b may respectively select different output frame layouts according to the attributes and the number of different selected/detected ROIs in each of the panoramic images A and B to generate two different composite frames 320a and 320b to be transmitted through the network to the communication devices 130a and 130b for display. For example, in FIG. 1, the communication device 130b displays the compose layout A, and the communication device 130a displays the speaker layout.

In addition, please note that since a meeting is dynamic process, corresponding contents of panoramic image keep changing. Thus, attributes and number of framed ROIs also vary according to the contents of the panoramic image and finally, the output frame layout changes according to the attributes and the number of the framed ROIs. For example, start with an empty meeting room, then all the attendees enter the meeting room (the top-down layout may be selected), then the meeting begins, then a main speaker speaks (the speaker layout may be selected), then someone asks questions (the picture-in-picture layout may be selected), then someone moves or leaves, then someone joins (the grid layout may be selected), then few people gather for discussion (the focus layout may be selected), and finally the meeting ends.

Figures 8A, 8B, 8C:
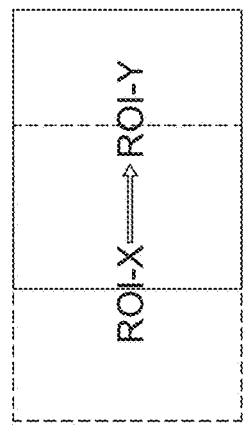
FIGS. 8A to 8C show different transition effects as the output frame layout changes according to this invention.

FIGS. 8A to 8C show different transition effects as an output frame layout changes according to this invention. When the output frame layout changes from A to B, some transition effects are required. For example, as shown in FIG. 8A, an output frame layout A (not shown) originally displays ROI-X, and after transition, the output frame layout B (not shown) intends to display ROI-Y. A dashed-bold-line rectangle in FIG. 8A represents the original display range of ROI-X in the output frame layout A. After the original display range of ROI-X is increased by 1.2 times to form a dashed-thin-line rectangle (i.e., increased leftward and rightward by 10%), if the right edge of the dashed-thin-line rectangle can reach the left edge of the target ROI-Y, then the lens can be directly panned rightward to the target ROI-Y in the panoramic image. Otherwise, it represents that the transition distance is too long, and thus the transition is directly made between ROI-X and ROI-Y, as show in FIG. 8B. In a case that the transition distance is too long, if the speed of panning the lens is fixed, then it may consume too much time; contrarily, if the transition time is fixed, then the speed of panning the lens may be too high. Neither scenario would be acceptable to the consumers, so a direct transition is made from ROI-X to ROI-Y in FIG. 8B. In the example of transitioning from the grid layout to the speaker layout, the aspect ratio of one window in the grid layout is slowly increased to satisfy the aspect ratio of a speaker window in the speaker layout as shown in FIG. 8C.

In the output frame layout, different projection methods are selected to present the output frame/picture according to different viewing-angle regions of either the ROIs or the selection frames. The predetermined projection methods include, but is not limited to, equirectangular projection, cylinder projection, perspective projection, Panini projection and fisheye projection.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image display method applicable to a video conferencing system having a wide-angle webcam for capturing a panoramic image having an aspect ratio greater than or equal to 2:1, the method comprising steps of:
   framing multiple regions of interest (ROIs) according to the panoramic image, wherein each of the ROIs has at least one of attributes;
   selecting one from predetermined frame layouts as an output frame layout, according to whether to insert a portion of the panoramic image and at least one of attributes, positions and the number of the ROIs;
   inserting at least one of the portion of the panoramic image and the ROIs into at least one corresponding window of the output frame layout to form a composite frame according to the attributes of the ROIs; and
   and
   transmitting the composite frame to a video software for display; wherein an aspect ratio of the composite frame corresponds to an aspect ratio of a picture displayed by the video software.

2. The image display method according to claim 1, wherein the attributes comprise: static, dynamic, recognized, speaking, merged, multiple-person, the number of persons, pinning, scale and aspect ratio.

3. The image display method according to claim 2, wherein the step of framing further comprises: estimating directions of arrival (DOAs) for the ROIs to obtain a possible direction of sound source; comparing angle differences between horizontal angular fields of view (HAFOVs) for the ROIs and the possible direction of sound source; and defining an attribute of a first ROI having a minimum angle difference as speaking; wherein the wide-angle webcam comprises at least two lenses and a microphone array, and both the lenses and the microphone array are properly arranged so that the HAFOVs of the panoramic image matches DOAs of the microphone array.

4. The image display method according to claim 2, wherein the step of framing comprises: framing second ROIs using one or a combination of human detection, human face detection and user's manual selection; and defining an attribute of each of the second ROIs as static.

5. The image display method according to claim 4, wherein the step of framing further comprises: selecting at least one third ROI from the second ROIs to perform object tracking; and defining an attribute of the at least one third ROI as dynamic.

6. The image display method according to claim 4, wherein the step of framing further comprises: performing face recognition over fourth ROIs that are detected by the human detection and the human face detection; marking a human name on each of the fourth ROIs; and defining an attribute of each of the fourth ROIs as recognized.

7. The image display method according to claim 2, further comprising: when a HAFOV difference between two center points of any two of the ROIs is smaller than a predetermined angle, merging the two ROIs into one union ROI after the step of framing and before the step of selecting; and defining the attributes of the two merged ROIs as at least one of merged, multiple-person and the number of persons.

8. The image display method according to claim 2, further comprising: when any two of the ROIs overlap, merging the two ROIs into one union ROI after the step of framing and before the step of selecting; and defining the attributes of the two merged ROIs as at least one of merged, multiple-person and the number of persons.

9. The image display method according to claim 1, wherein the step of inserting comprises: adjusting aspect ratios of the ROIs and the portion of the panoramic image to satisfy aspect ratios of their corresponding windows.

10. The image display method according to claim 9, wherein the step of adjusting comprises: extending a range of a selection frame for a target ROI in the panoramic image; removing a superfluous image from the target ROI according to the aspect ratio of its corresponding window upon determining that the range of the selection frame of the target ROI is not extendable; and deforming an image in the target ROI according to the aspect ratio of its corresponding window upon determining that the range of the selection frame for the target ROI is not extendable and the superfluous image in the target ROI cannot be removed.

11. The image display method according to claim 10, wherein the step of adjusting further comprises: during the course of extending the range of the selection frame for the target ROI, upon determining that one edge of the panoramic image hinders the selection frame from extending, pushing back the extended selection frame from the hindered edge of the panoramic image to satisfy an aspect ratio of its corresponding window.

12. The image display method according to claim 10, wherein the step of adjusting further comprises: during the course of extending the range of the selection frame for the target ROI, upon determining that one edge of the panoramic image hinders the selection frame from extending, adding a black block to a corresponding edge of the extended selection frame to satisfy an aspect ratio of its corresponding window.

13. The image display method according to claim 1, further comprising: increasing a display range of a current ROI by a predetermined multiple when a current output frame layout is unequal to a previous output frame layout; panning a lens to transition from the current ROI to a target ROI upon determining that the display ranges of the increased ROI and the target ROI overlap; and directly transitioning from the current ROI to the target ROI in the current output frame layout upon determining that the display ranges of the increased ROI and the target ROI do not overlap.

14. The image display method according to claim 1, wherein the step of inserting comprises: deciding whether to insert the portion of the panoramic image into its corresponding window of the output frame layout; comparing priorities of the ROIs to generate a sorted ROI string; and inserting the sorted ROI string into their corresponding windows in the output frame layout.

15. The image display method according to claim 14, wherein the step of comparing further comprises: exchanging positions of two neighboring ROIs in the sorted ROI string upon determining that a difference between priorities of the two neighboring ROIs in the sorted ROI string is smaller than a threshold value and one ROI of the two neighboring ROIs having a lower priority comprises a specific attribute, wherein the specific attribute represents the one ROI having the lower priority does not affect picture aesthetics while being inserted into corresponding window.

16. The image display method according to claim 14, wherein the step of comparing comprises steps of: (a1) respectively assigning different priorities to the attributes of the ROIs; (a2) setting a delegate priority to the highest priority among all attributes for each ROI; (a3) sorting the ROIs according to the delegate priorities of the ROIs; (a4) when the delegate priorities of at least two ROIs are the same, setting the delegate priority to the second highest priority among all attributes for each of the at least two ROIs; and (a5) repeating the steps (a3) to (a4) until the sorted ROI string is generated.

17. The image display method according to claim 14, wherein the step of comparing comprises: (b1) respectively assigning different priorities to the attributes of the ROIs; and (b2) adding up the priorities of all attributes to obtain a sum priority for each of the ROIs; and (b3) sorting the ROIs according to the sum priorities of the ROIs.

18. The image display method according to claim 17, wherein the step of comparing further comprises: (b4) when the sum priorities of at least two ROIs are the same, setting a delegate priority to the highest priority among all attributes for each of the at least two ROIs; (b5) sorting the at least two ROIs according to the delegate priorities of the at least two ROIs; (b6) when the delegate priorities of at least two ROIs are the same, setting the delegate priority to the second highest priority among all attributes for each of the at least two ROIs; and (b7) repeating the steps (b5) to (b6) until the sorted ROI string is generated.

19. The image display method according to claim 14, wherein the step of comparing comprises: (c1) dividing the attributes of the ROIs into multiple levels; (c2) respectively dividing the attributes at the same level into multiple classes, wherein the multiple levels have different level priorities and the multiple classes have different class priorities; (c3) setting a level priority to the highest level priority among all attributes for each of the ROIs; and (c4) sorting the ROIs according to the level priorities of the ROIs.

20. The image display method according to claim 19, wherein the step of comparing further comprises: (c5) when the level priorities of at least two ROIs are the same, setting the class priority to the highest class priority among all attributes at the corresponding level for each of the at least two ROIs; (c6) sorting the at least two ROIs according to the class priorities of the at least two ROIs; (c7) when the class priorities of at least two ROIs are the same, setting the level priority to the second highest level priority for each of the at least two ROIs; and (c8) repeating the steps (c4) to (c7) until the sorted ROI string is generated.

21. The image display method according to claim 19, wherein the step of comparing further comprises: (d1) when the level priorities of at least two ROIs are the same, adding up the class priorities of all attributes at the corresponding level to obtain a sum class priority for each of the at least two ROIs; (d2) sorting the at least two ROIs according to the sum class priorities of the at least two ROIs; (d3) when the sum class priorities of the at least two ROIs are the same, setting the level priority to the second highest level priority for each of the at least two ROIs; and (d4) repeating the steps (c4), (d1) to (d3) until the sorted ROI string is generated.

* * * * *